Jan. 18, 1955  G. M. CLOSS  2,699,970
APPARATUS FOR CONTROLLING FLOW OF CONTACT MATERIAL
Filed Dec. 27, 1950
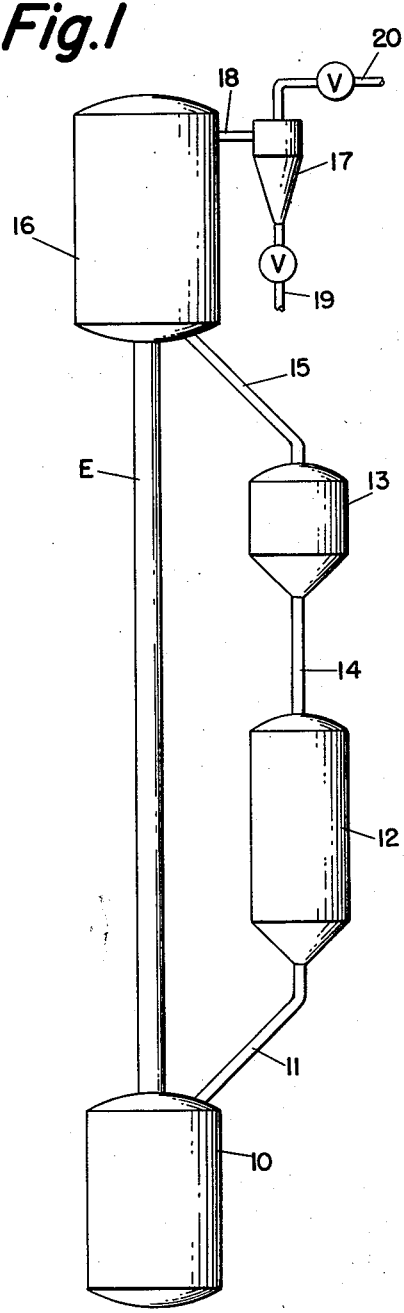
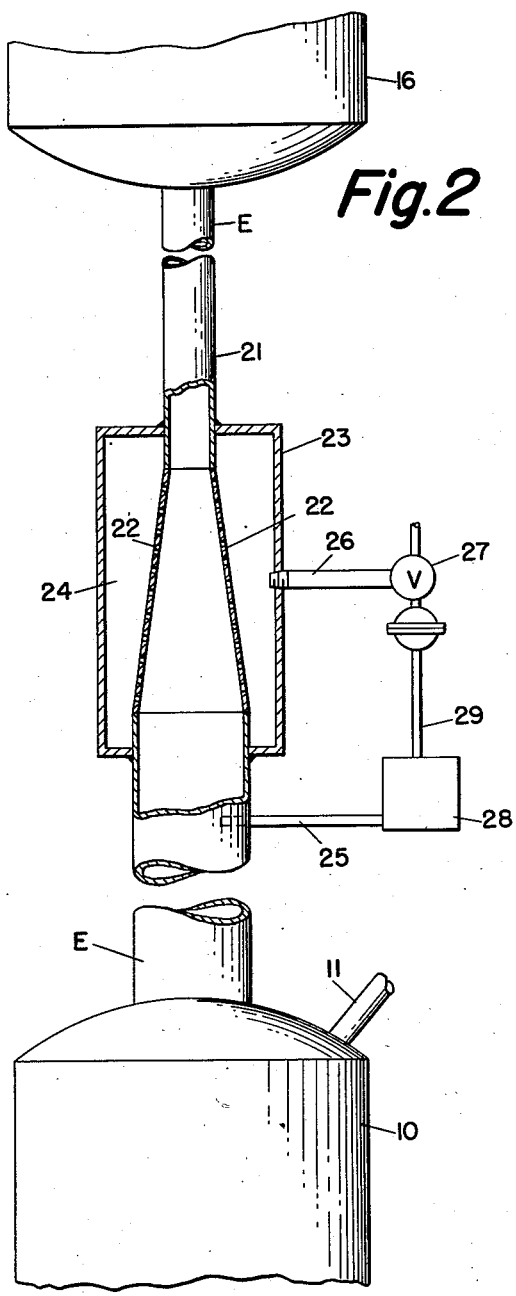
INVENTOR.
GEORGE MAITLAND CLOSS
BY
ATTORNEYS

United States Patent Office 2,699,970
Patented Jan. 18, 1955

2,699,970

APPARATUS FOR CONTROLLING FLOW OF CONTACT MATERIAL

George Maitland Closs, Toledo, Ohio, assignor to Sun Oil Company, Philadelphia, Pa., a corporation of New Jersey Application December 27, 1950, Serial No. 202,956

2 Claims. (Cl. 302—17)

This invention relates to a system and apparatus for moving pneumatically granular or pelleted contact material or catalyst from a lower vessel, which receives the material in a continuous stream, upwardly into an upper vessel. In particular the invention is directed to apparatus for elevating by gas, air or other fluid lifting medium contact material from the lower vessel to and through an elevating conduit in such a manner as to reduce attrition of the material particles or pellets to a minimum during passage to the upper vessel.

It is well known in the art of catalytic operations, such as the cracking of heavier petroleum fractions to gasoline and other hydrocarbon processing operations to use granular or pelleted catalytic or contact material in a continuous system. In such systems a conversion zone is operated continuously to produce the desired product while a second zone operates continuously in regeneration. Most commercial moving catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regeneration zone to the upper conversion zone two well known means applicable to the transportation of granular solids from one locus to another have been used namely: by mechanical conveyers and by pneumatic conveyers, in the latter of which air, steam, refinery gas or flue gas produced at the refinery is readily available as the pneumatic lifting medium.

It is necessary in systems employing conversion and regeneration zones in superposed relationship to convey the catalyst or contact material which is in pelleted or granular form continuously upwardly to a height of several hundred feet, in order that it can be delivered continuously by gravity to the conversion and regeneration zones to maintain them in operation. Conveying the material upwardly by a fluid medium requires a vessel positioned at a level below that of the lower reaction zone which is designed to initiate the lifting or upward conveying operation. This lowermost vessel is generally known in the art as an engager since the material is engaged therein by the lifting fluid to effect the lifting operation. An elevating or a lift conduit has its lower end extending into or is in communication with the engager vessel while its upper end communicates with an upper vessel positioned at a level above the level of the upper end of the upper reaction zone or chamber. The upper vessel is designed so that the lifting medium is separated from the catalyst or contact material and is generally known as the disengager.

Specifically the present invention is directed to the elevating conduit or lift portion of a continuous catalyst or contact material system and the particular arrangement for preventing the contact material from becoming attrited within the disengager by designing the conduit in a manner to bleed a controlled amount of lifting fluid before the mixture of lifting fluid and contact material is discharged into the disengager.

Referring to Figure 1, the engager is indicated at 10 and receives the catalyst or contact material by gravity continuously through line 11 from the regeneration zone 12 positioned below the upper conversion zone 13 which is in communication with zone 12 through line 14. The conversion zone 13 receives the material by gravity continuously by line 15 from the disengager 16. Means for elevating the contact material from the engager 10 to the disengager 16 is shown generally at E. Separating means such as a cyclone separator 17 is in communication with the disengager 16 through line 18 and fines are removed from the separator through line 19 while the lifting medium is removed from the separator through line 20. Figure 1 does not show any details of the present invention and is provided only to show the general arrangement of a system wherein catalyst or contact material is utilized in the form of a continuously moving mass.

Referring to Figure 2 only a portion of the engager 10 and disengager 16 is shown since the invention is concerned only with the elevating or lift conduit E positioned therebetween. It will be understood, however, that contact material will be supplied continuously to the engager 10 through conduit 11 and that a body or mass of the contact material will be maintained in the engager 10. The contact material can be moved from the engager 10 into the elevating conduit E, for example, in accordance with the teaching of the application of John F. McKinney, Jr., Serial No. 184,601, filed September 13, 1950, for "Method and Apparatus for Elevating Contact Material," or similar devices, wherein is disclosed the utilization of several lifting fluid streams applied directly to the body of material in the engager to force the material upwardly into the elevating conduit.

As the material advances through the lift conduit at some desired or predetermined velocity the conduit, according to the present invention, is provided in its upper end portion 21 with an apertured area 22 which may be formed of any desired types of openings. The apertured area is shown tapered, which shape, while having certain advantages, is not essential to the invention. The apertured area will by preference be positioned in the conduit below and adjacent to the disengager 16; however, when the conduit E extends upwardly into the disengager for some distance the apertured area may be in that portion of the conduit and it is within the scope of the invention to provide the apertured area in the conduit in the portion within the disengager and also in some zone therebelow or to provide several apertured zones below the disengager.

The purpose of providing an apertured zone or zones in the conduit is to reduce the pressure or velocity of the lifting fluid before the mixture is discharged from the elevating conduit into the disengager and thus reduce the height of rise of the mixture therein and reduce the force of contact of the material with the walls of the disengager.

The volume of lifting fluid removed before the mixture is discharged into the disengager is controlled in accordance with pressure conditions existing in the conduit E. To accomplish this a housing 23 is secured about the apertured zone in a manner to provide a sealed chamber 24 herewith and a conduit 25 is placed in communication with the conduit E. The conduit 25 although shown below the housing 23 can be positioned between the housing and disengager or be in communication with the conduit portion 21 within the disengager. Another conduit 26 is placed in communication with the chamber 24 and is provided with a diaphragm valve 27. A pressure controller 28, or other suitable means of controlling the quantity of air or other lifting media removed, is positioned between conduit 25 and valve 27 through pressure line 29. Thus it will be seen that the removal of lifting fluid from conduit E through the apertured area 22 may be controlled in accordance with variations in pressure conditions in conduit E.

I claim:

1. In apparatus for elevating granular material from a lower vessel to an upper vessel through an elevating conduit which is in communication with both vessels, the improvement which comprises an apertured area in the conduit, a housing about said apertured area providing a fluid chamber, a connection between the conduit and the housing, and a pressure controlled valve in said connection for regulating the flow of fluid from said chamber in accordance with variations in pressure conditions in the elevating conduit.

2. In apparatus for elevating granular material from a lower vessel to an upper vessel through an elevating conduit which is in communication with both vessels, the improvement which comprises a zone of apertures in said conduit in its upper end portion, a housing enclosing said zone of apertures providing a sealed fluid chamber, a conduit in communication with said chamber, a valve in said conduit, a second conduit in communication with the elevating conduit, a pressure controller between said second conduit and said valve for controlling the flow of fluid from said chamber.

References Cited in the file of this patent

UNITED STATES PATENTS

| | | |
|---|---|---|
| 494,274 | Kelley | Mar. 28, 1893 |
| 1,597,438 | Ennis | Aug. 24, 1926 |